Jan. 15, 1935.    J. M. RYAN    1,988,216
GLAND PACKING
Filed Oct. 21, 1932

JOHN M. RYAN
INVENTOR

PER Albert J. Fike
ATTORNEY

Patented Jan. 15, 1935

1,988,216

UNITED STATES PATENT OFFICE 1,988,216

GLAND PACKING

John M. Ryan, Chicago, Ill.

Application October 21, 1932, Serial No. 638,937

1 Claim. (Cl. 288—1)

This invention relates to improvements in gland packing, and has for one of its principal objects the provision of an improved packing for shafts of all kinds whether reciprocating or rotating, and for all purposes and all conditions both cold and and hot up to a reasonable temperature.

One of the important objects of this invention is to provide a gland packing for steam engines, water pumps, pumps handling air or gas, and all liquids, oil or the like, refrigerating machines and appurtenances, and for any purpose where it is desired to prevent leakage around the piston rod or shaft and through the stuffing box.

Another important object of the invention resides in the provision of a semi-metallic packing ring which is easy to install or remove, which will not set up solid, and which eliminates scoring of rods or sleeves.

Another and still further important object of the invention resides in the provision of a packing for shafts or the like which will expand to a considerable degree under pressure, giving long life, and which, furthermore, will not carbonize, crystallize, or deteriorate in service or in stock on shelves.

Another main object of the invention is to provide coiled packing for stuffing boxes or the like which reduces friction and which provides a liquid seal for each ring of the coil.

Other and further important objects of the invention will be apparent from the disclosures in the accompanying drawing and following specification.

The invention, in a preferred form, is illustrated in the drawing and hereinafter more fully described.

Figure 1:
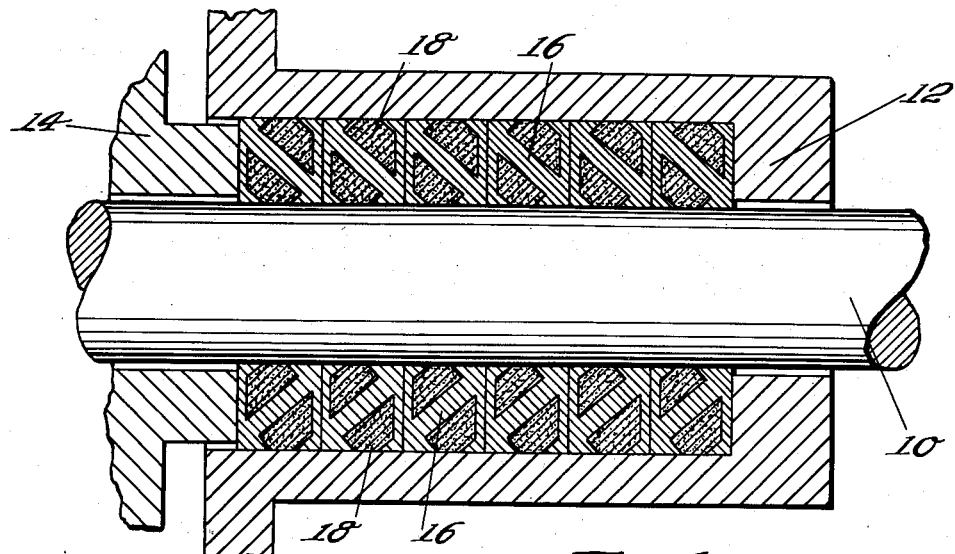
Figure 1 is a sectional view of a stuffing box on a shaft, showing the improved packing of this invention applied thereto.

The reference numeral 10 indicates generally a shaft to which a stuffing box 12 is applied and which stuffing box has a gland or other wrench or pressure operated element associated therewith as shown at 14. The shaft 10 may be either rotating or reciprocating, as the packing of this invention is equally serviceable in both.

Figure 3:
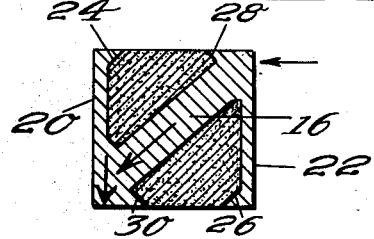
Figure 3 is an enlarged detail sectional view of the improved packing of this invention, illustrating particularly the action thereof under gland pressure.

As best shown in Figures 1 and 3, the improved packing of this invention comprises essentially a metallic form or mold 16 of Z-shape in cross section and which is applied to the shaft in such a manner that pressure on the gland produces a novel and important result.

Incorporated into the open spaces or grooves of the Z-shaped metallic packing element 16 is a filling 18 of fiber, asbestos, cotton, or the like which is impregnated with a suitable lubricant such as graphite or similar material as in the usual practice. For pumps handling acid, a rubber filler or other soft packing may be used; and for oil, cork or leather may be employed; and flax for handling water. The Z-shaped portion of the packing can be crumpled, rolled or otherwise shaped, and may be of suitable metal such as copper, lead, tin, zinc or alloys.

It will be noted that the sections of packing are positioned in the gland and against the shaft in such a manner that there is a combination bearing of metal and fiber or packing on the shaft face. This metal is preferably a soft alloy of lead which is formed by extruding through a die or the like.

Figure 2:
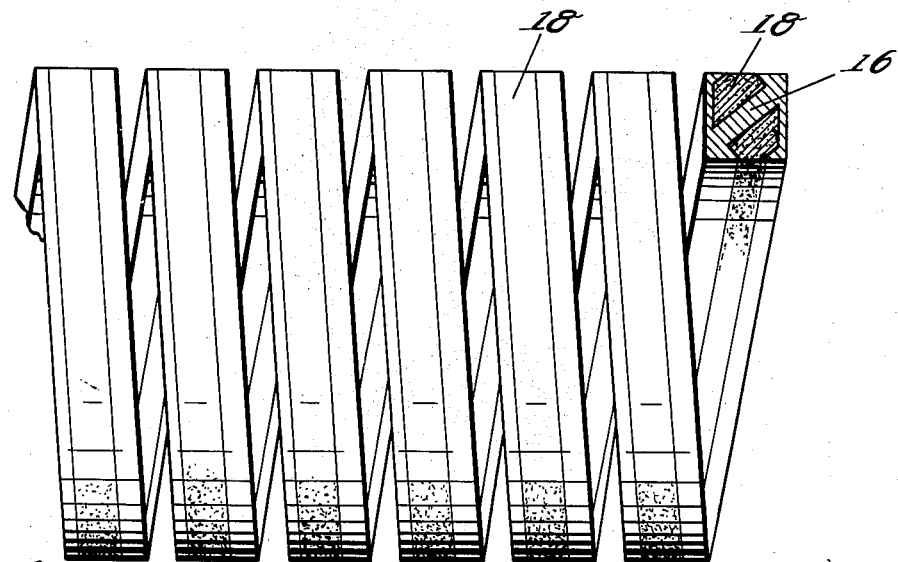
Figure 2 is a detail view, partly in section, illustrating a length or coil of the packing.

As will be best evident from Figures 2 and 3, the diagonal portion of the Z-shaped packing is heavier than the winged portions 20 and 22, as most of the thrust of the gland element 14 is applied to the diagonal members 16.

Additionally, inturned flanges 24 and 26 are formed respectively on the wings 20 and 22 so that the fibrous packing 18 is more securely retained in the metal mold. This action is accentuated by the extensions 28 and 30 which adjoin the diagonal web 16, so that when the metal and fibrous material are assembled into the packing strip, a unitary structure will result which is best suited for all operating and starting conditions.

Pressure applied to this style of packing forces the packing to the shaft at an angle of about forty-five degrees as best shown in Figure 3, and forms a secure bearing on the shaft of metal to metal as indicated by the vertical arrow in this figure. This action also expands the packing approximately twenty per cent in the width which provides for take-up when necessary without abuse to the packing. The metal to metal fit allows the fibrous material 18 to pull slightly away from the shaft or at least decreases the pressure at these points whereby a liquid seal results for each ring of packing and friction is reduced as much as fifty per cent. That portion of the packing which is adjacent the shaft is not packed as tightly into the Z-shaped holder as the portion away from the shaft, there being from ten to twenty per cent less packing on the shaft side. This provides for additional pressure at the back of the gland, and a softer and less dense material at the friction face.

The fact that the soft packing does not contact the material of the shaft to any great extent eliminates scoring, and the packing itself is protected from wear. Additionally, the pressure is retarded in stages as each ring of packing forms a separate stage with its own individual seal and metallic running fit.

Whenever a rod or shaft has been scored, the angular action of the packing of this invention produces a very satisfactory fit of the packing metal into the scored portions, thereby very satisfactorily preventing leakage. This is particularly true for rotating shafts.

For reciprocating shafts, rubber backing may be used which automatically provides for the expansion and contraction, reducing the operator's attention to a minimum. The actual costs of this equipment are considerably less on account of the fact that each installation has a much longer life in that it is designed to overcome the deteriorating effect of excess gland or wrench pressure.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

A semi-metallic packing for shafts, comprising a metallic element of substantially Z shape in cross section, the ends of the wings and the body of the Z being provided with opposed flanges forming recesses with restricted openings for reception of fibrous packing, said flanges serving to retain said packing in position and out of contact with said shaft when packing pressure is applied to said packing and also provide a metal bearing surface of substantial area for contact with the shaft whereby to form a series of alternate metal to metal packing and liquid seal areas, the body of said Z being of a thickness materially greater than that of the wings.

JOHN M. RYAN.